(12) United States Patent
Lundgren et al.

(10) Patent No.: US 8,705,175 B1
(45) Date of Patent: Apr. 22, 2014

(54) DOUBLE SIDED LENS FILM WITH DECORATIVE OPTICAL PATTERN AND PROCESS FOR MAKING THE SAME

(71) Applicants: Neil Lundgren, Bloomer, WI (US); Rahul Sarda, Bloomer, WI (US)

(72) Inventors: Neil Lundgren, Bloomer, WI (US); Rahul Sarda, Bloomer, WI (US)

(73) Assignee: Bloomer Plastics, Inc., Bloomer, WI (US)

( * ) Notice: Subject to any disclaimer, the term of this patent is extended or adjusted under 35 U.S.C. 154(b) by 0 days.

(21) Appl. No.: 13/828,866

(22) Filed: Mar. 14, 2013

Related U.S. Application Data

(60) Provisional application No. 61/622,952, filed on Apr. 11, 2012.

(51) Int. Cl.
*G02B 27/10* (2006.01)

(52) U.S. Cl.
USPC .......................................................... 359/619

(58) Field of Classification Search
USPC .......................................................... 359/619
See application file for complete search history.

(56) References Cited

U.S. PATENT DOCUMENTS

2008/0259634 A1* 10/2008 Mi et al. ................. 362/606

* cited by examiner

*Primary Examiner* — James Jones
(74) *Attorney, Agent, or Firm* — Anthony J. Bourget

(57) ABSTRACT

Lens or lenticular films and processes for making the same where both sides of the film have lenticular embossments and exhibit unique optical patterns, with one method including extruding a molten polymer web and passing the web together with a lenticular film having a lenticular pattern embossed on a first side of the lenticular film through a nip where the molten polymer web is passed against a lenticular embossing roll thereby transferring an embossed pattern to a first side of the molten polymer web.

20 Claims, 8 Drawing Sheets

DOUBLE SIDED LENS FILM WITH DECORATIVE OPTICAL PATTERN AND PROCESS FOR MAKING THE SAME

CROSS-REFERENCE TO RELATED APPLICATIONS

This application claims the benefit and priority of Provisional Patent Application Ser. No. 61/622,952 filed Apr. 11, 2012, for DOUBLE SIDED LENS FILM WITH DECORATIVE OPTICAL PATTERN AND PROCESS FOR MAKING THE SAME under 35 U.S.C. §119(e), incorporated herein by reference in its entirety for continuity of disclosure.

BACKGROUND OF THE INVENTION

1. Field of the Invention

The present inventive concept relates generally to lens or lenticular films and processes for making the same, and more specifically to films having lenticular properties on both sides of the film and having decorative optical patterns, and processes for making the same.

2. Background Information

Production of lenticular film is known. Some examples of lenticular film and processes for making the same include those disclosed in patents such as U.S. Pat. No. 7,781,022, U.S. Pat. No. 7,660,041, U.S. Pat. No. 6,995,914, U.S. Pat. No. 6,124,975, and U.S. Pat. No. 3,357,772.

While the foregoing products and methods are beneficial, there is always room for improvement.

SUMMARY OF THE INVENTION

The present inventor set out to create a lenticular film having a lenticular or optical pattern on both sides of the product. The lenticular film is a flexible sheet material having a predetermined surface characteristic of high quality and definition formed on two sides thereof. The inventor discovered that applying a lenticular pattern to both sides of the product resulted in a unique and unexpected optical effect or pattern. Particularly, a double-sided lenticular film having a unique visual effect is obtained by putting multiple layers of lenticular films together. In one aspect, a lenticular film is prepared with one side having a lenticular pattern. Thereafter, a second layer of film is provided to the first layer where the second layer also has one side bearing a lenticular pattern. The resultant combination is a double-sided lenticular film having a unique line pattern.

When undertaking the inventive process the present inventor was uncertain whether lenticular film would lose its lenticular optical properties or have its lenticular properties distorted when the film is combined with another layer of heated plastic during a casting operation. The present inventor found that the lenticular properties survived and experienced little if any distortion, and more unexpectedly, discovered that a unique optical pattern may be produced. In one aspect the unique pattern is a series of generally parallel optical lines as described below.

The above summary of the present invention is not intended to describe each illustrated embodiment, aspect, or every object or implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
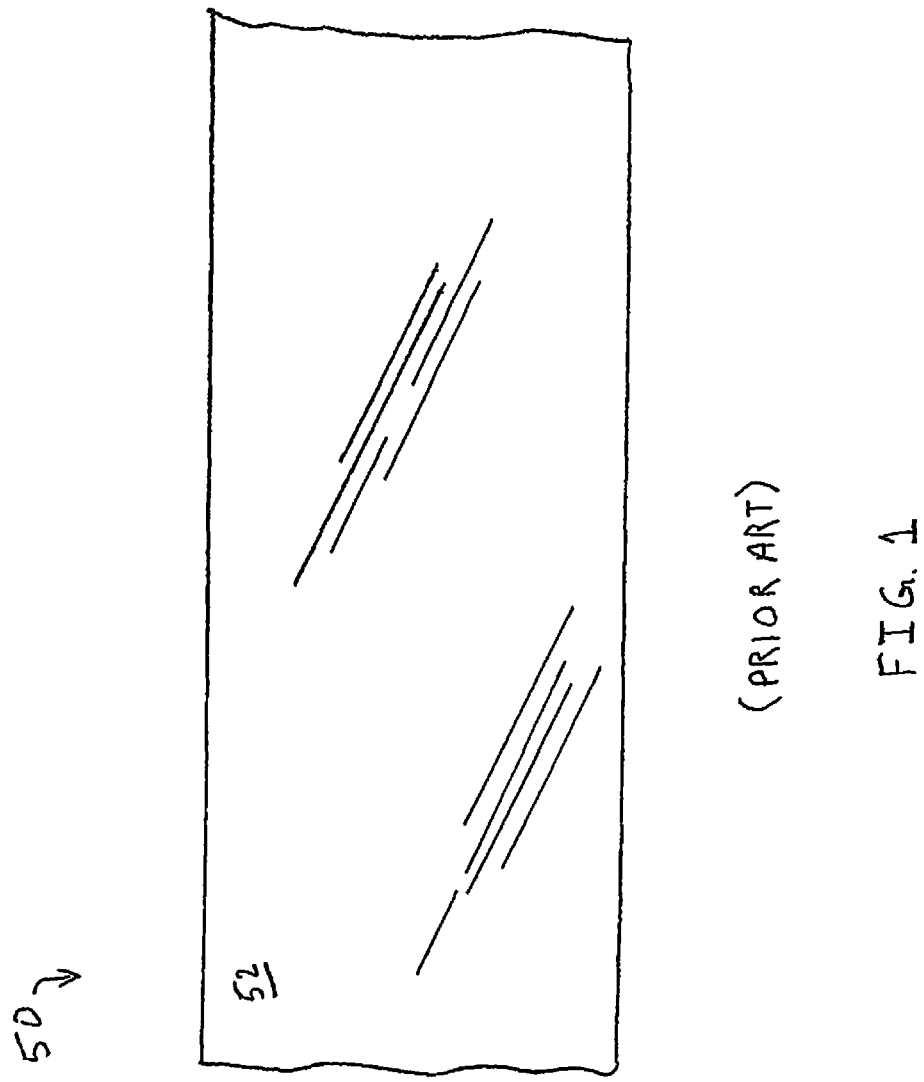
FIG. 1 is a plan view of a prior art lenticular film.

While the invention is amenable to various modifications and alternative forms, specifics thereof have been shown by way of example in the drawings and will be described in detail. It should be understood, however, that the intention is not necessarily to limit the invention of the particular embodiments described.

DETAILED DESCRIPTION OF THE INVENTION

The following detailed description is not to be taken in a limiting sense, but is made merely for the purpose of illustrating the general principles of the invention, since the scope of the invention is best defined by the appended claims.

FIG. 1 depicts a prior art example of a lenticular film 50. This film has lenticular optical properties associated with only one side of the film, or the embossed side 52. The lenticular properties are formed in the film by extruding plastic through an extruder and passing the heated plastic through a nip where the nip includes a rubber roller and a lenticular embossed roll. The embossed roll imparts the lenticular surface upon the film. An opposite side of the film 50 does not have the lenticular pattern and is otherwise referred to as being untreated or "smooth" or a smooth side 30. Lenticular lenses are generally thin, transparent lenses that are flat on one side and include a plurality of parallel, linear, side-by-side lenticules or lens elements 40 (elongate or convex lenses) on a second side. In some instances an image is printed on the flat or smooth side to create a desired visual effect of the image when viewed through the lenticules 40 on the opposing side. A lenticular assembly is produced when combining the lenses and an image. Special metal cylinders are created to form the lens shapes. The cylinders or rollers 62 are engraved with lens shapes or patterns (emboss grooves 40) to extremely high accuracies, and produce a thin flexible web of lenticular film 50 using an extrusion process.

Figure 2:
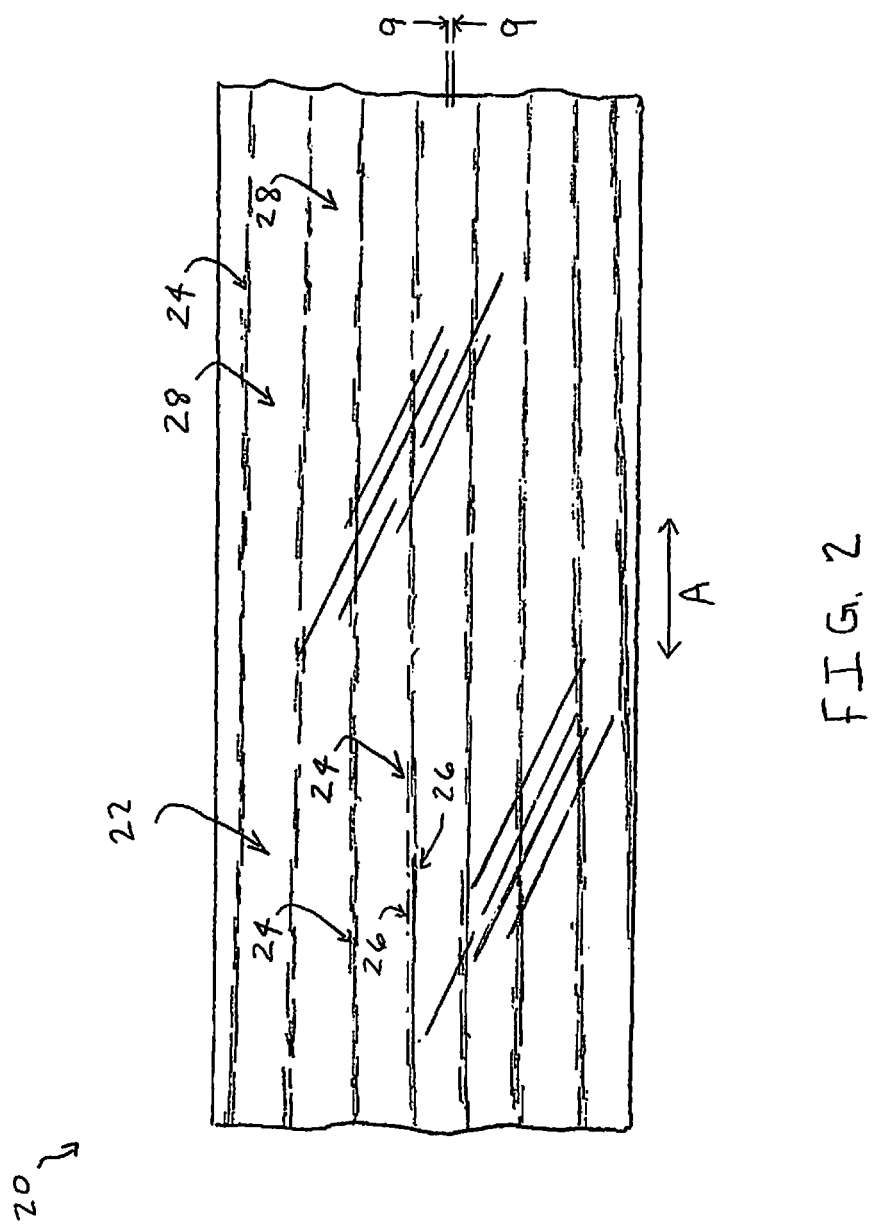
FIG. 2 is a plan view of a double-sided lenticular film in accordance with an embodiment of the present invention.

According to one aspect of the invention, film 20 as shown in FIG. 2 includes a unique optical feature 22. Particularly, film 20 includes optical stripes 24 as shown. A plurality of stripes 24 may be present. The stripes 24 comprise spaced lines 26. A pair of spaced lines 26 appear as to define or as bordering stripes 24. Stripes 24 are spaced apart and define channels 28. The stripes 24, lines 26 and channels 28 are oriented along a line generally shown as arrow A. The lenticular lenses 40 or lines embossed by the lenticular embossed roll 62, 64, are also oriented along the line generally shown as arrow A. Alternatively lenticular lenses 40 may be oriented along a line running generally perpendicular to arrow A. It may be appreciated that the stripes 24 may be wavy or deviate from alignment along a perfectly straight line. While film 20 appears to have bumps or ridges at the stripe 24 locations that look as though they would have different texture as compared to the channel 28 locations, film 20 is smooth to the touch. This illusion is particularly surprising given the very thin nature of film 20.

The optical stripes 24 or lines 26 are illusions. Particularly, stripes 24 and lines 26 are not an actual lens lines but are illusions or reflected light rays oriented in a visual light line.

It may be appreciated that film 20 may be made in various thicknesses. While film 20 may have thickness that is greater or lesser, in one example film 20 has a thickness ranging from 6 to 12 mils (thousandths of an inch). In one aspect film 20 may have a thickness of about 8 mils (i.e., where film 50 having thickness of about 4 mils is combined with polymer web 61 having thickness of about 4 mils). It may be appreciated that film 50 and polymer web 61 may have varying thicknesses. In one instance the thicknesses remain constant during an extrusion process. It may be appreciated that additional material may be added to film 20 to vary the thickness and properties.

Use of transparent materials in film 20, and at such thin structure, allows for a dramatic visual effect when the materials are treated as described herein. The stripes 24, lines 26 and channels 28 of film 20 appear as an illusion. In the present example of FIG. 2 the optical feature 22 also appears to be a film 20 having embedded wires or other elements as an illusion. The optical feature 22 also presents a 3-dimensional corrugation effect, especially when viewing film 20 from a side angle or perspective. Film 20 is very thin and is flexible. Film 20 may be bent, creased, and rolled. Film 20 may come in various lengths and widths, and may be cut or reshaped.

Film 20 is transparent. Optical feature 22 is also visible from a back view of film 20. The back side view appears as a mirror or identical image of the front side view. It may be appreciated that film 20 may be rolled or folded or split or cut as desired.

Figure 3:
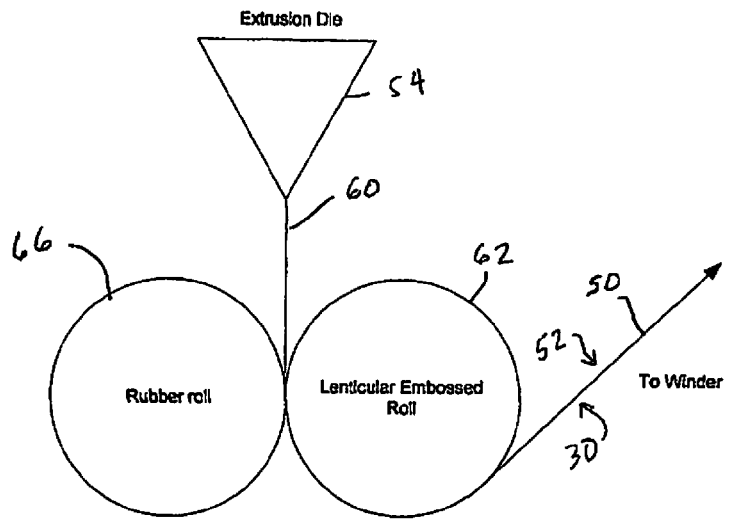
FIG. 3 is a schematic diagram of a step in the process of a further aspect of the present invention.
Figure 4:
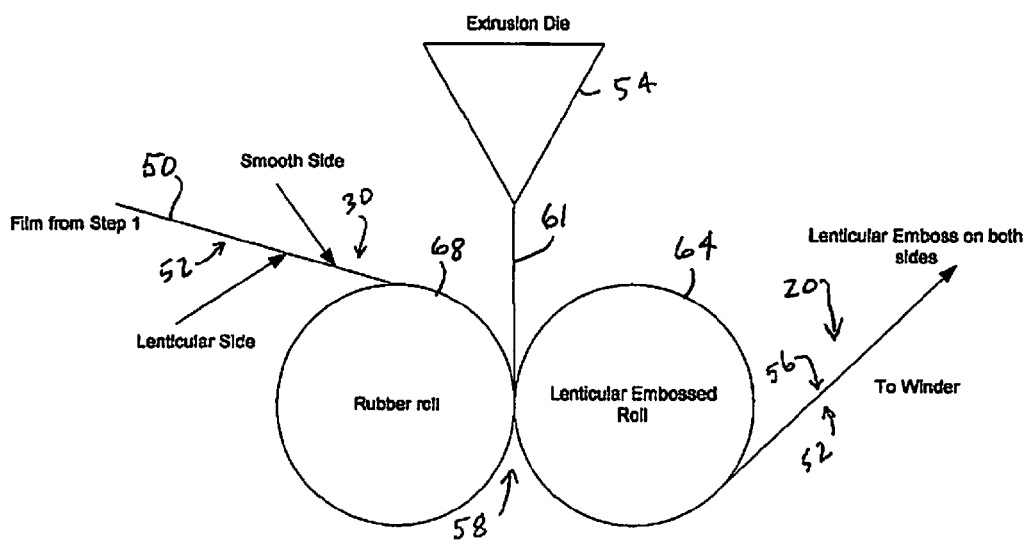
FIG. 4 is a schematic diagram of a step in the process of a further aspect of the present invention.

In accordance with a further aspect of the invention, FIG. 3 and FIG. 4 depict steps (Step 1 and Step 2) of a method for producing film 20. In Step 1, shown in FIG. 3, lenticular film 50 can be manufactured using a cast film process where the web of molten polymer 60 exits an extrusion die 54 and is pressed against a lenticular embossing roll 62 transferring the emboss pattern to the polymer web to make a resulting lenticular film 50 where only one embossed side 52 has the embossed lenticular pattern. The lenticular pattern in this example includes several lines or lenticules 40 (for instance about 200 lines per inch where the lines run generally along an orientation as shown by arrow A). The lenticules 40 or lines are too small to be readily seen by the naked eye. FIG. 1 depicts one example of film 50. In one aspect, film 50 may be wound on a roll.

In Step 2 (See FIG. 4), a film 20 having unique visual effects is obtained by combining multiple layers (at least two layers in this example) of film together. The layers may be combined using the coating/lamination process where the "smooth" side 30 (i.e., the side not embossed by the lenticular roll 62) of the lenticular film 50 produced in Step 1 is bonded with molten polymer 61 extruded from an extrusion die 54. In one example, as film 50 is passed through the nip defined by the rubber roll 68 and the lenticular embossed roll 64 in Step 2, the polymer web 61 receives the lenticular embossment. Film 20 thereby exhibits an embossed side 56 embossed with the lenticular pattern on the side opposite embossed side 52 to achieve a lenticular surface on both sides of film 20. Polymer 60 and 61 may contain the same ingredients or may contain different ingredients. Film 20 is a two layer film and has a lenticular surface on both sides. Additional treatments or layers may be added to film 20 (either before or after Step 2) as desired. Film 20 may be delivered to a winder or roll, or may be fed to another step for further processing.

Figure 5:
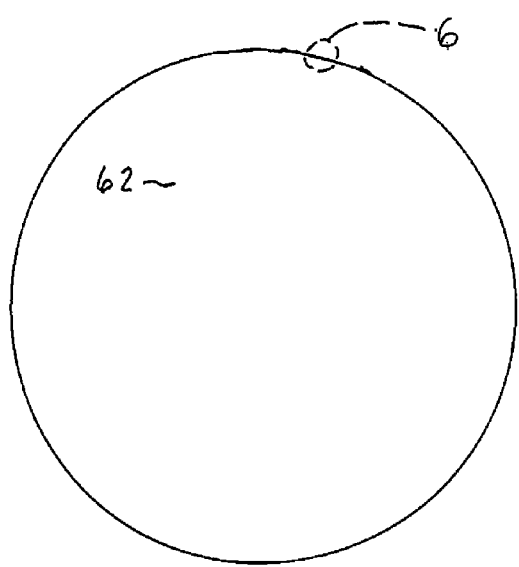
FIG. 5 is a side elevation view of an embossed roll for use in conjunction with the present invention.
Figure 6:
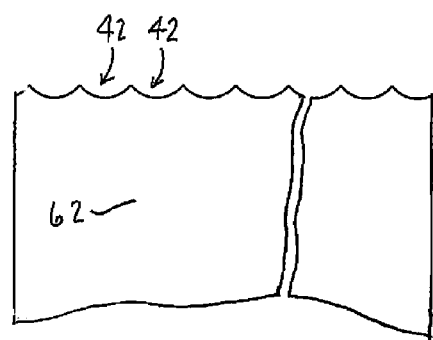
FIG. 6 is a greatly enlarged partial cross-section view of the roll of FIG. 5 showing the area indicated by 6 in FIG. 5.
Figure 7:
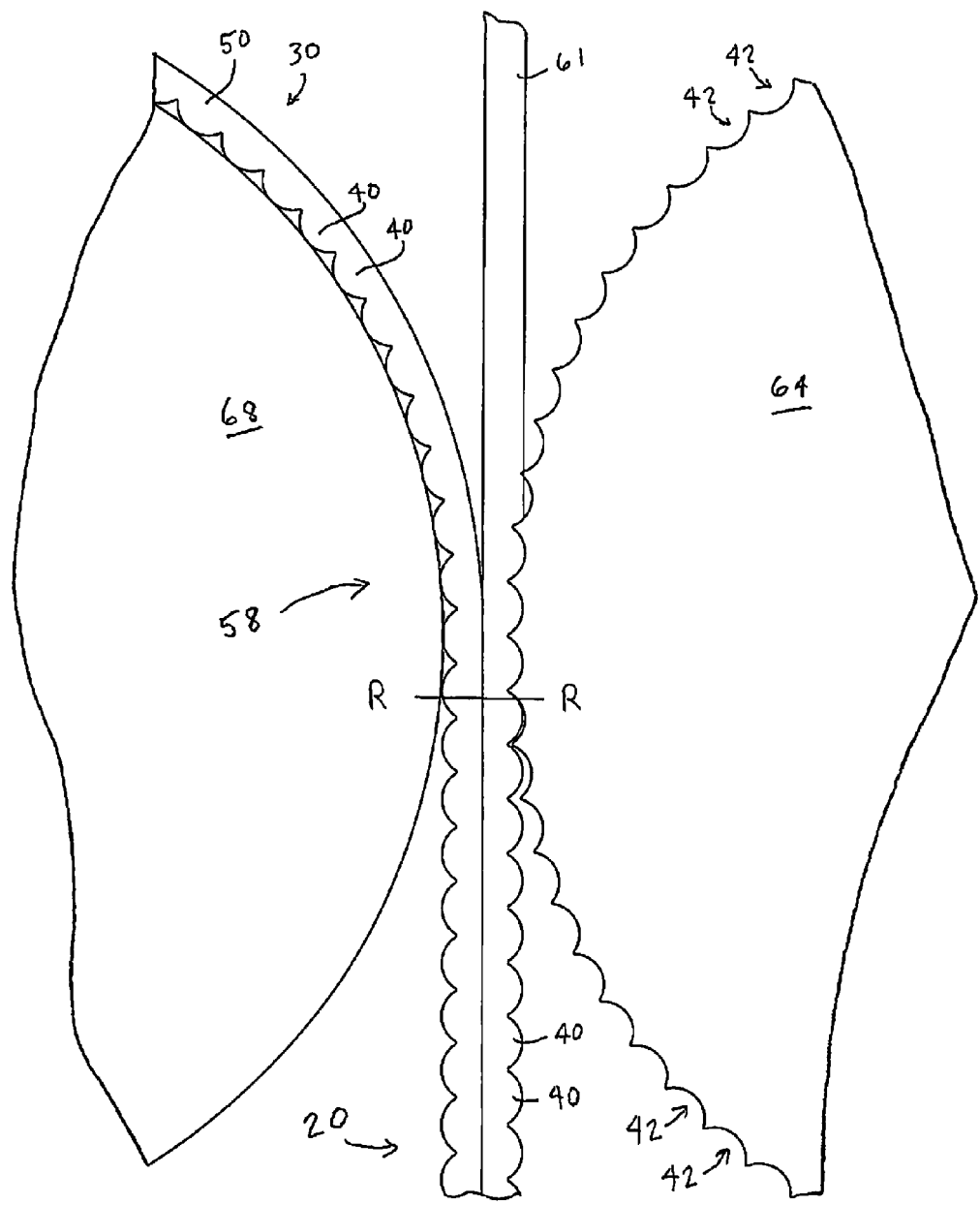
FIG. 7 is a greatly enlarged view of one aspect of a nip area of the diagram of FIG. 4 with portions greatly exaggerated for illustration purposes.

Further aspects of the invention are presented with reference to FIG. 5, FIG. 6 and FIG. 7. FIG. 5 and FIG. 6 depict an emboss roll 62 having emboss grooves 42. Grooves 42 impart a shape upon molten polymer when the polymer passes upon roll 62. A variety of types of emboss grooves 42 may be used. Different pitch, spacing, depths, angles, and profiles may be configured for the surface of roll 62 as desired. As may be appreciated in FIGS. 5 and 6, the emboss grooves 42 in one example run horizontally along the length of roll 62. In an alternative example with reference to FIGS. 10 and 11, emboss grooves 42 are aligned to circumvent roll 62. In one example roll 62 may be treated to comprise approximately 200 separate grooves 42 per inch. Other numbers of grooves 42 or other shapes may also be used in an embossed roll.

FIG. 7 shows a greatly enlarged view of the nip area 58 of the diagram of FIG. 4 with portions greatly exaggerated for illustration purposes. For instance, emboss grooves 42 that are shown on roll 64 are greatly exaggerated given the curvature of roll 64 and roll 68. In one example emboss grooves 42 are too small to be readily seen by the naked eye. The view is also exaggerated in other respects, however the general function or concept of the embossing action is presented for illustration purposes. In one example, it may be appreciated that polymer web 61 is fed to nip area 58 and is met with film 50. In one instance film 50 is a single-sided lenticular film. At nip area 58 polymer web is embossed by lenticular roll 64 and simultaneously bonded with film 50. A resulting film 20 is produced and travels past nip area 58 for further handling. In one instance film 20 separates contact with nip area 58 (for example at reference line R) and travels downward as depicted in FIG. 7. In another instance film 20 may continue to travel along roll 64 as generally shown in FIG. 4 for continued treatment or storage.

Figure 8:
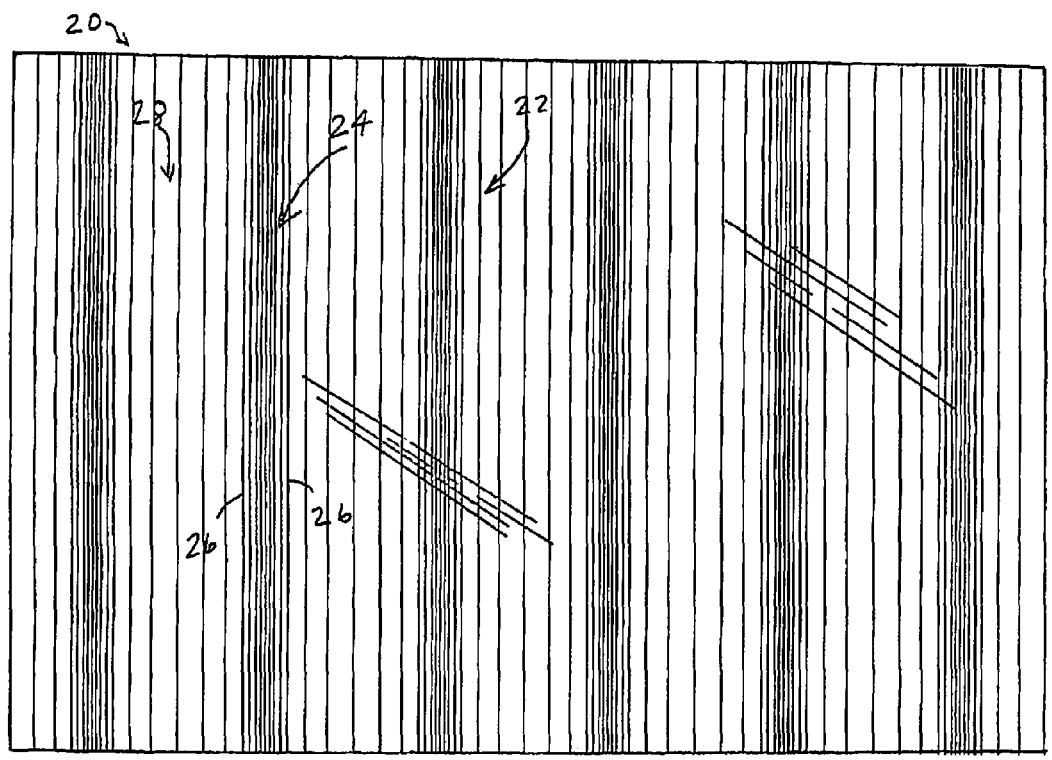
FIG. 8 is plan view of a double-sided lenticular film in accordance with aspects of the present invention.

FIG. 8 shows one aspect of a film 20 made in accordance with the steps noted herein. The optical stripes 24 are illusions created by the lenticules 40 that are embossed on both sides of film 20. The lenticules themselves cannot be readily seen by the naked eye, yet the light illusion presents a linear or wavy pattern that does not exist in a single-sided lenticular film.

Figure 9:
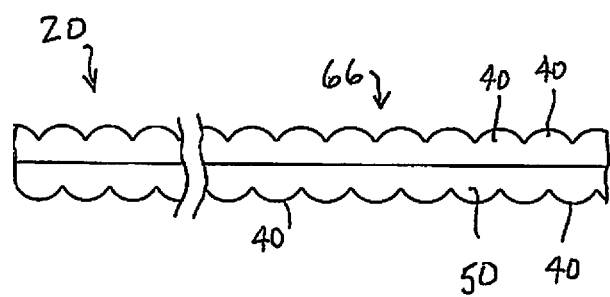
FIG. 9 is a greatly enlarged partial cross-section view of the film of FIG. 2 taken along line 9-9 of FIG. 2.

As shown in FIG. 9, film 20 includes a first embossed layer 66 bonded to a second embossed layer 50. In one example the particular lens elements 40 are configured to be the same, while in other instances the lens elements 40 of layer 66 may be different than the lens elements 40 of layer 50. In one instance as shown in FIG. 9 the lens elements 40 of layer 66 will be staggered with respect to the lens elements 40 of layer 50. In other instances the lens elements 40 of layer 66 may coincide and/or align with the lens elements 40 of layer 50. It may be appreciated that a printing or other layer may also be inserted between layer 66 and layer 50.

In one aspect of the invention, emboss rolls 62 and 64 are identical. For instance, the exact same roll 62 may be used in both Step 1 and Step 2.

In a further aspect, emboss rolls 62 and 64 may be different (i.e., they may contain different patterns and/or different lenticular lines per inch to change the visual properties and optical features 22. A variety of types of emboss rollers 62, 64 may be used for making the lenticular embossments.

In a further aspect, the process may be run in one step using two steel emboss rolls to impart the emboss on both sides of film 20. For instance, two embossed rolls 62, 64 may create the nip through which molten polymer 60 passes in Step 1.

In a further aspect, the process may include the process shown in Step 1 where film 50 is fed into the nip at Step 2 without prior winding of film 50 (i.e., completed as a single in-line step).

Figure 10:
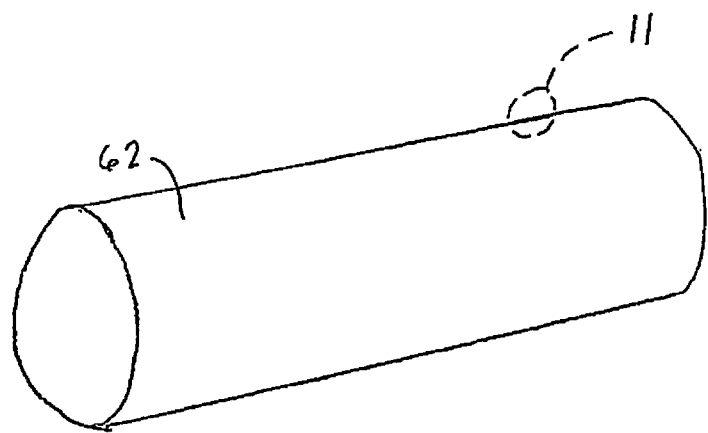
FIG. 10 is a perspective view of an embossed roll for use in conjunction with the present invention.
Figure 11:
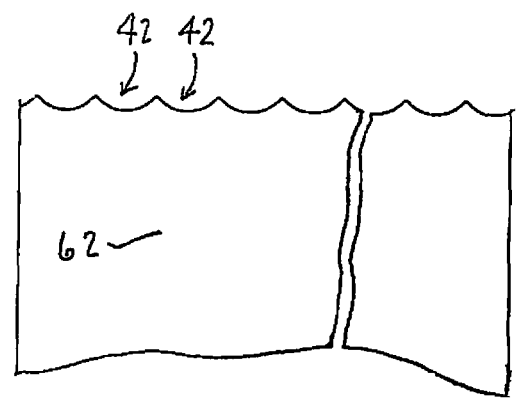
FIG. 11 is a greatly enlarged partial cross-section view of the roll of FIG. 10 showing the area indicated by 11 in FIG. 10.

In further aspects, the lines imparted by lenticular embossed roll 62, 64 may be parallel or may be diverted or slightly off-set from parallel to produce different visual effects (including wavy lines or stripes or other images). Roll 62 shown in FIG. 10 shows an end view of a cylindrical roll 62. In one aspect roll 62 which may be cylindrical and will have lenticular lines or embossments engraved therein where the lines circumvent the cylinder about its surface. In other aspects the lenticular lines may run parallel to a longitudinal central axis of the cylindrical roll 62. It may be appreciated that the emboss grooves 42 shown on FIG. 6 are oriented generally parallel to a longitudinal central axis of the roll 62 (or roll 64 as desired). The grooves 42 shown in FIG. 7 are for illustration purposes where the lenticules 40 are to be oriented in a cross direction compared to the machine direction or flow direction of web 61. It may be appreciated that circumferentially oriented grooves 42 as shown in FIG. 11 may be alternatively to roll 64 of FIG. 7. The film 20 shown in FIG. 2 was produced using a cylindrical roll 62, 64 having lenticular line engravings that circumvent the respective rolls (as in FIGS. 10 and 11). In this manner the stripes 24, lines 26 and channels 28 run generally in the same direction as the lenticular line engravings of the rolls 62, 64. It may be appreciated that the orientation of lenticular line engravings of the rolls may be varied to produce different optical effects. Using a roll 62 with circumventing lines in Step 1, and a roll 64 with longitudinal lines in Step 2, or vice versa, is contemplated.

In further aspects, film 20 may be converted and further treated, such as by including additional layers or coatings (either before or after Step 1, and/or either before or after Step 2) to one or both sides of film 20, by printing (with letters, figures, designs, patterns, etc.) on sides of film 20 or on additional layers combined with film 20. Film 20 may be treated or combined with various backings, including metalized backing, adhesive coatings, lamination to substrates, flood coat, and cross lamination to provide unique crosshatch appearances. Film 50 which is supplied to the nip in Step 2 may also be treated or combined with various backgrounds as noted above.

In one instance smooth side 30 of film 50 may be treated with printing. A reverse image may be included so that a text message can appear. In a further instance another layer of film (or multiple layers of film or other material) may be inserted between layers 50 and 61 by feeding a layer (or extruded molten polymer) to nip area 58. Adhesives may be used as desired.

Film 20 may be used for or as a label or labels (wrapped and/or peelable), packaging or packages, pouches, box coverings, bags, as decorative materials such as wall coverings, banners, signage, privacy film, light diffusers, tapes, security tape, security films, and may be combined with other films or backers.

It may be appreciated that lenticular embossed rolls may be made with greater or lesser lenses (greater or lesser lines per inch). The embossed roll 62 used in the example above includes lens lines of 200 per inch. Roll 64 in the above example in Step 2 was the same roll 62 as used in Step 1. Material 60, 61 is transparent, such as polypropylene, so light may penetrate and/or pass through film 20.

It should be understood, of course, that the foregoing relates to exemplary embodiments of the invention and that modifications may be made without departing from the spirit and scope of the invention as set forth in the following claims.

What is claimed is:

1. A method of producing a two-sided lenticular film comprising:

passing a first web of molten polymer against a lenticular embossing roll thereby transferring an embossed pattern to a first side of the first polymer web; and extruding a second web of molten polymer and passing the second web of molten polymer together with the first polymer web through a nip where the second web is passed against a lenticular embossing roll thereby transferring an embossed pattern to a first side of the second polymer web.

2. The method of claim 1 where the second web and the first web are laminated together when passing through the nip.

3. The method of claim 1 where a second side of the first polymer web bonds with a second side of the second polymer web when passed together through the nip.

4. The method of claim 1 where the first lenticular embossing roll used to emboss the first molten polymer is the same as the second lenticular embossing roll used to emboss the second web of polymer.

5. The method of claim 1 where the second lenticular embossing roll is made with the same lens pattern as the first lenticular embossing roll.

6. The method of claim 1 where the second lenticular embossing roll includes a greater number of lenticules/lines per inch as compared to the first lenticular embossing roll.

7. The method of claim 1 where the first polymer web is transferred to a winder after passing against the first lenticular embossing roll.

8. The method of claim 1 where the first polymer web and the second polymer web are made with polymer ingredients that are the same.

9. The method of claim 1 where the first polymer web and the second polymer web are made with a product formula that is the same.

10. The method of claim 1 where the first polymer web and the second polymer web are extruded using identical production profiles.

11. A method of producing a film having lenticular surfaces on both sides of the film, said method comprising:

extruding a molten polymer web and passing the molten web together with a lenticular film having a lenticular pattern embossed on a first side of the lenticular film through a nip where the molten polymer web is passed against a lenticular embossing roll thereby transferring an embossed pattern to a first side of the molten polymer web.

12. The method of claim 11 where a second side of the molten polymer web bonds with a second side of the lenticular film.

13. The method of claim 12 where the second side of the molten polymer web and the second side of the lenticular film are devoid of lenticular embossment.

14. A two-sided lenticular film made according to the method of claim 11.

15. The film of claim 14 configured to exhibit an illusion of stripes embedded within said film.

16. The method of claim 11 where the lenticular film includes printing on a second side of the lenticular film.

17. The method of claim 11 where said passing the web together with a lenticular film further comprises passing a further film through the nip.

18. The method of claim 17 where the further film includes printing.

19. A method of producing a film having lenticular surfaces on both sides and exhibiting stripes embedded within the film, said method comprising:

extruding a molten polymer web and passing the web together with a lenticular film having a lenticular pattern embossed on a first side of the lenticular film through a nip where the molten polymer web is passed against a lenticular embossing roll thereby transferring an embossed pattern to a first side of the molten polymer web, the film exhibiting a plurality of stripes.

20. The method of claim 19 where the stripes are visible from both sides of the film, the method further comprising including a print to the lenticular film.

\* \* \* \* \*